US006468336B1

(12) United States Patent
Fiedler et al.

(10) Patent No.: US 6,468,336 B1
(45) Date of Patent: Oct. 22, 2002

(54) WATER-BORNE ZINC SILICATE SHOP PRIMERS

(75) Inventors: Helle Fiedler, Copenhagen (DK); Dorte Jeanette Jensen, Ebriechsdorf (AT); Ulla Kirsten Neestrup Hansen, Copenhagen; Gruska Elisabeth Folkmann Musaeus, Virum, both of (DK)

(73) Assignee: J.C. Hempel's Skibsfarve-Fabrik A/S, Lyngby (DE)

( * ) Notice: Subject to any disclaimer, the term of this patent is extended or adjusted under 35 U.S.C. 154(b) by 0 days.

(21) Appl. No.: 09/578,864

(22) Filed: May 26, 2000

Related U.S. Application Data
(60) Provisional application No. 60/137,721, filed on Jun. 7, 1999.

(30) Foreign Application Priority Data

May 26, 1999 (DK) ......................................... 1999 00733

(51) Int. Cl.[7] .............................. C09D 5/08; C09D 5/00
(52) U.S. Cl. ............................... 106/14.21; 106/14.12; 106/286.8; 106/287.1; 106/600
(58) Field of Search ..................... 106/14.12, 14.21, 106/600, 286.8, 287.1

(56) References Cited

U.S. PATENT DOCUMENTS

| | | | |
|---|---|---|---|
| 3,549,395 A | 12/1970 | Sears et al. ................ | 106/623 |
| 3,620,784 A | 11/1971 | Schutt ........................ | 106/623 |
| 4,011,088 A | 3/1977 | Makishima et al. ........ | 106/1.17 |
| 4,154,617 A * | 5/1979 | Keithler .................... | 106/1.17 |
| 4,208,452 A * | 6/1980 | Keithler .................... | 427/204 |
| 4,888,056 A * | 12/1989 | van der Kolk et al. .... | 106/1.17 |
| 5,580,371 A | 12/1996 | Falberg .................... | 106/14.12 |
| 5,888,280 A * | 3/1999 | Montes ..................... | 106/14.21 |

FOREIGN PATENT DOCUMENTS

| | | |
|---|---|---|
| DE | 2101577 | 7/1972 |
| EP | 346385 B1 | 12/1989 |
| JP | 70476 A | 3/1995 |
| JP | 08-060038 | 3/1996 |
| JP | 08-060039 | 3/1996 |
| WO | WO8806177 | 8/1988 |
| WO | WO9515445 | 6/1995 |
| WO | WO9858028 | 12/1998 |

OTHER PUBLICATIONS

K. Zimmermann, European Coating Journal; Jan./1991, pp. 14–17. Zinc flakes for corrosion protection.

Journal of Protective Coating & Linings, p. 44; Anatomy of Paint (No date).

J. Boxall, Polymers Paint Colour Journal; Jul./1991; 181, pp. 443–444; Review of Protective Pigments.

Laminox AR, A new grade of MIO for Zinc Primers (No date).

Roberto Maltant; PCE, Jun. 1998; pp. 18–22; An Overview of Current Shop Primer Technology.

Paint Specification No. 20; Nov. 1, 1982; pp. 275–279; Zinc–Rich Primers.

* cited by examiner

*Primary Examiner*—Anthony J. Green
(74) *Attorney, Agent, or Firm*—Birch, Stewart, Kolasch & Birch, LLP

(57) ABSTRACT

The present invention relates to novel water-borne shop primer (preconstruction primer) compositions comprising 5–40% by volume of a pigment mixture; 1.4–10% by volume of one or more water soluble silicates (based on the dry volume of the silicate); 40–90% by volume of water; and optionally one or more additives; said pigment mixture comprising 40–90% by weight of zinc, 10–60% by weight of micaceous iron oxide (MIO), and 0–50% by weight of a second filler (e.g. barium sulphate, kaolin, muscovite, quartz, etc.). The present invention also provides a method of using a shop primer composition for temporary protection of a steel surface, and to a method for the manufacture of a steel construction.

19 Claims, No Drawings

WATER-BORNE ZINC SILICATE SHOP PRIMERS

This application claims priority on provisional Application No. 60/137,721 filed on Jun. 7, 1999, and Danish Application PA 1999 00733 filed May 26, 1999, the entire contents of which are hereby incorporated by reference.

FIELD OF THE INVENTION

The invention relates to water-borne zinc silicate shop primer compositions including a suitable amount of zinc, micaceous iron oxide and optionally a second filler.

BACKGROUND OF THE INVENTION

In marine and industrial construction, it is usually desirable to pre-paint steel with a zinc-containing primer before fabrication, and many such coating compositions known as shop primers or pre-construction primers are known, see e.g. Maltanti, Protective Coatings Europe, Jun. 16–22, 1998.

Shop primers, or preconstruction primers, are paints intended for short-term protection of steel during fabrication and before application of the full paint system. It must protect steel from rusting in usually aggressive environments and provide a sound surface for subsequent coats.

Many of such compositions include zinc powder in an organic resin such as an epoxy resin, an epoxy ester, a polyurethane, a polystyrene resin or a silicone resin. Coatings based on these organic binders are not well suited for coating steel that must ultimately be welded because the binder tends to decompose from the heat of the weld, resulting in pores in the weld seams.

In view of the compositions based on an organic resin, compositions based on a silicate-based binder system have been developed. Such compositions can be divided into two separate classes, namely water-borne or solvent-borne compositions.

One early example of an alternative to coatings based on organic binders was a zinc-containing coating based on inorganic binders, Schutt (U.S. Pat. No. 3,620,784). The coating composition contains zinc powder carried in a silicate vehicle. The particular formulation disclosed by Schutt is said to avoid many of the problems commonly encountered with inorganic coatings: weather wear, cracking, crazing and non-uniform adherence before and after baking. However, even if one surmounts the problems associated with the physical characteristics of the applied silicate coating, as Schutt claims to have done, one is still faced with the problem of welding steel that has been coated with zinc powder primer in a silicate vehicle. During welding, the vaporised substances can penetrate the weld root and become entrapped, creating a porous weld. It is sometimes possible to partially overcome the porosity problem by reducing the welding speed sufficiently to allow the gas to escape ahead of the weld. Even when this technique is successful, however, it results in increased fabrication costs due to reduced welding speed.

Among the solvent-borne compositions can be mentioned WO 88/06177 which discloses shop primer composition comprising zinc powder, fillers and pigments including a certain proportion of conductive fillers and pigments, antisettling agents, optionally thickening agents, a silicate-type binder, and a solvent; and Zimmermann, Eur. Coatings. J, 1991, 1, 14–19, which discloses solvent-borne compositions in which a portion; of zinc has been replaced by fillers, e.g. micaceous iron oxide.

The disadvantage of using solvent-borne compositions are the environmental problems with handling of the composition and disposal of solvents evaporating from the object coated with the composition. Thus, water-borne compositions which differentiates from the solvent-bases systems have been developed.

Among the known water-borne compositions, it is known that a portion of zinc in zinc-containing primers can be replaced by iron phosphide and/or nickel phosphide of suitable particle size. The resulting zinc-coated steel, while retaining its anti-corrosive properties, can be more readily and efficiently welded.

As an example of this approach, Makishima et al. (U.S. Pat. No. 4,011,088) have proposed an anti-corrosive coating composition comprising 5 to 80% of a binder, which is either potassium silicate or ammonium silicate, and 20 to 95% of a pigment mixture of zinc powder and iron phosphide and/or nickel phosphide. It is stated that the ratio between zinc powder and phosphide should be in the range of 8:2 to 2:8 as "if the proportion of zinc is smaller than this range, the electrochemical anti-corrosive effect by zinc powder is insufficient, and if the proportion of phosphide is smaller than the above range, the weldability of the resulting coating is reduced." In the embodiment in which potassium silicate is used as the binder, Makishima et al. indicate that the ratio of silicate to potassium should be between 2.5 and 4.0. If the molar ratio is smaller than 2.5, the film forming property is said to be insufficient and if the molar ratio is larger than 4.0, the stability of the binder is said to be reduced. In the examples, the average particle size of the zinc powder and the phosphide is generally 5 $\mu$m. Inclusion of other fillers is not suggested. Furthermore, it is described by Makishima et al. that useful properties are only found for the combination of the phosphide fillers and inorganic silicate binders, i.e. water soluble silicate binders.

Falberg (U.S. Pat. No. 5,580,371) has proposed yet another example of a zinc-containing primer that provides a durable, corrosion-resistant coating, combined with suitable weldability. The primer comprises zinc, iron phosphide and an aqueous potassium silicate solution wherein the ratio of silicate to potassium is between 4.1 and 6.0. It appears to be crucial that the amount of zinc in the pigment/filler part of the composition is 35–90% by weight and that the amount of iron phosphide in the pigment/filler part is 10–65% by weight. It is stated that the most preferred particle size for zinc as well as for iron phosphide is in the range of 3–8 $\mu$m. It is stated that "other pigments and fillers may be added to the composition of the invention as long as the percentages of zinc and iron phosphide are maintained within the stated range." It should be noted that iron phosphide is obtained from limited natural sources, thus it can be envisaged that the potentially increasing prices for iron phosphide will be prohibitive for it's use in industrial products.

WO 98/58028 describes water-borne protective coatings (i.a. preconstruction primers) comprising zinc dust, Group IA metal silicates, colloidal silica and a carbonate-containing internal hardener. It is mentioned that the composition may comprise pigments and fillers (among which micaceous iron oxide is mentioned as an example). The role of the pigment and fillers is apparently only to make a film of the coating non-transparent as it is stated that "[t]he amount of pigment and filler that is used to form the composition is understood to vary, depending on the particular composition application, and can be zero when a clear composition is desired". This is confirmed by the examples where no filler is used in the example illustrating a pre-construction primer.

Although certain technologies have been suggested within the field of water-borne zinc silicate shop primers, Maltanti (Protective Coatings Europe, June 1998, p 16–22) states that "In spite of paint manufacturers' efforts to develop and formulate [water-borne coatings], the goal seems to be far away. A lot of work remains in research and testing to produce a suitable and effective water-borne shop primer".

Thus, In view of the above there is a need for alternative approaches for water-borne zinc silicate shop primers as metal phosphide filler types are rather expensive and sometime not fully efficient as predominant constituents of the pigment mixture of water-borne zinc silicate shop primers.

SUMMARY OF THE INVENTION

The applicants have found that water-borne zinc silicate shop primers comprising zinc, a well-defined amount of micaceous iron oxide, and optionally a portion of an additional filler are cost-efficient and provide excellent properties with respect to weldability, corrosion resistance for a sufficient period of time, etc.

The present invention thus provides a water-borne shop primer composition comprising:
- (a) 5–40% by volume of a pigment mixture,
- (b) 1.4–10% by volume of one or more water soluble silicates (based on the dry volume of the silicate),
- (c) 40–90% by volume of water, and
- (d) optionally one or more additives, said pigment mixture comprises
  40–90% by weight of zinc,
  10–60% by weight of micaceous iron oxide, and
  0–50% by weight of a second filler.

The present invention also provides a method of using a shop primer composition for temporary protection of a steel surface, and to a method for the manufacture of a steel construction.

DETAILED DESCRIPTION OF THE INVENTION

The shop primer composition according to the present invention is preferably a fast drying primer which, when applied onto metallic surfaces, e.g. steel or steel alloy surfaces, as a 10–30 $\mu$m dry film, provides an efficient anti-corrosive protection of the steel material for at least 6 months, and which does not have any detrimental effect on welding of steel surfaces coated with the composition.

The shop primer composition of the invention comprises, as essential constituents, (a) a pigment mixture comprising zinc, micaceous iron oxide and optionally one or more second fillers; (b) one or more silicates; and (c) an amount of water. The composition may also contain one or more additives, which should not impair the anti-corrosive protection or excellent welding properties of the resultant composition.

In a preferred embodiment of the invention the shop primer composition contains:
- (a) 5–40% by volume, such as 10–35% by volume, preferably 16–30% by volume of a pigment mixture,
- (b) 1.4–10% by volume, such as 2.5–9% by volume, preferably 4.5–8.5% by volume of one or more silicates (based on the dry volume of the silicate),
- (c) 40–90% by volume, such as 50–85% by volume, preferably 65–80% by volume of water, and
- (d) optionally 0.03–12% by volume, preferably 0.03–5% by volume of one or more additives.

Per definition, the combination of zinc and the filler(s) is to be considered as the pigment mixture of the shop primer. Pigments are generally characterised in that they render the final shop primer coating non-transparent and non-translucent. The pigments of the pigment mixture in the present context are furthermore selected from pigment-like ingredients. These materials are characterised in that they do not render the paint non-translucent and therefore do not contribute significantly to hide any material below the coating. In the present context, i.e. within the field of shop primer compositions, it is normally not necessary or relevant to make a clear distinction between pigments and pigment-like ingredients. One the contrary, possible constituent of the pigment mixture, which at least includes zinc and micaceous iron oxide, are chosen based on their combined anti-corrosive and weldability properties when included in the water-borne zinc silicate shop primer composition.

Based on volume parts, the pigment mixture constitutes 5–40% by volume, such as 10–35% by volume, preferably 16–30% by volume, of the (wet) composition.

Based on weight parts, the pigment mixture preferably constitutes 25–75% by weight, preferably 35–70% by weight, in particular 45–65% by weight, of the (wet) shop primer composition.

One important constituent of the composition is, as mentioned above, zinc which constitutes 40–90% by weight, such as 50–85% by weight, of the pigment mixture. In most embodiments, the zinc content is preferably 60–90% by weight, such as 70–85% by weight or 75–90% by weight. In particular low zinc embodiments (see below), the zinc content may be 40–60% by weight, such as 45–55% by weight, of the pigment mixture.

The zinc used in the composition can be metallic zinc in the form of a powder or flakes, hollow spheres embedded with zinc on the surface, minerals embedded with zinc on the surface, and polymers embedded with zinc on the surface. Alternatively, the zinc can be surface-treated metallic zinc chemically inert to the aqueous environment. Preferably, the zinc has a mean particle size in the range of 0.5–20 $\mu$m, such as 1–15 $\mu$m, preferably 2–5 $\mu$m or 6–9 $\mu$m. In particular, the zinc is in the form of zinc powder, especially of the stated particle size ranges.

The content of a particular amount of micaceous iron oxide is one of the main features of the present invention. It is presently believed that the content of micaceous iron oxide should be 10–60% by weight, such as 10–40% by weight, in particular 10–25% by weight, especially 10–20% by weight, of the pigment mixture. It is envisaged that particular "high" micaceous iron oxide composition may be applicable as well; such composition may have a pigment mixture content of 25–60% by weight, such as 30–50% by weight, of micaceous iron oxide.

When referred to in the present context, micaceous iron oxide can be natural or artificial micaceous iron oxide (MIO) such as Laminox® and Hematite.

In an interesting embodiment, the pigment mixture comprises micaceous iron oxide and a second filler. It should be understood that even further filler components may be used as long as the total amount of the second fillers is within the ranges stated herein (such further fillers will all be calculated as "the" second filler).

As should be understood, it is preferred, in particular when a second filler is included, that the combined amount of micaceous iron oxide and any second filler is 15–60% by weight of the pigment mixture.

The second filler (with in principle may be a single filler or a combination of two or more fillers) is independently selected from the group consisting of iron oxides (other than micaceous iron oxide); natural and precipitated barium sulphate, barytes, blanc fixe; aluminium silicate, kaolin, kaolinite, china clay; magnesium silicate and magnesium hydrosilicate, mica, talc, chlorite, tremolite; silica, surface treated silica, amorphous quartz, crystalline quartz, fumed silica; aluminium oxide and hydrate, bauxite, calcined bauxite; calcium magnesium carbonate, dolomite; natural and precipitated calcium carbonate; aluminium silicates, feldspar; nepheline syenite; calcium silicates, wollasionite; zinc oxide; zinc phosphate; graphite; bismuth vanadate; lead chromate; silicium carbide; zeolites; pyrophyllite; glass flakes; iron phosphide; nickel phosphide; hollow spheres; and aluminium. Also possible are other families of sulphates, carbonates, silicates, oxides and vanadates. It is believed that at the most one of the fillers should be of the phosphide type. In a particularly interesting embodiment, none of the fillers are of the phosphide type. It is furthermore believed that the special combination of fillers provides the possibility of reducing the zinc content of the pigment mixture and thereby improving the weldability without compromising the anticorrosive properties.

As mentioned above, the pigment mixture in one preferred embodiment comprises micaceous iron oxide and a second filler. In one variant within this generally advantageous embodiment, the second filler includes barium sulphate. In another variant, the second filler includes kaolin.

In this invention the binder comprises one or more water-soluble silicates. Preferably the silicates are selected from water-soluble silicates resulting in inorganic shop primers which are hardly burned and do not decompose upon welding. Examples of water-soluble silicates are alkali metal silicates, such as lithium silicate, sodium silicate, or potassium silicate, and ammonium silicates, such as tetraethanol ammonium silicate, or diethanol morpholinium silicate. Preferably the binder comprises lithium silicate, sodium silicate, and potassium silicate among which lithium silicate and potassium silicate are the most preferred ones.

An interesting feature of the invention appears to be the complementary effects obtained by the combination of zinc and micaceous iron oxide, preferably micaceous iron oxide and a second filler, in the above-mentioned specific ratios.

The surprisingly good effect of the combination of zinc, micaceous iron oxide and optionally a second filler in water-borne silicate-containing shop primers can currently not be related to any specific theory. However, in order to obtain an optimal packing of the zinc silicate shop primer it appears to be desirable that the distribution of the particle size of the zinc, micaceous iron oxide and any second filler within the shop primer essentially covers the particle size range from 0.5 to 15 $\mu$m. Based on the results obtained so far, it is contemplated that the particle size distribution of the particles of the pigment mixture may play a certain role.

It is thus envisaged that particularly advantageous properties can be obtained when the zinc, micaceous iron oxide and a second filler together represent a trimodal particle size distribution. Any further fillers added may (or may not) fill any gaps in the total particle size distribution of zinc, micaceous iron oxide and the second filler.

In an embodiment of the invention, zinc itself has a mean particle size of 2–5 $\mu$m, by adding micaceous iron oxide and a second filler with complementary particle sizes, the optimal distribution of the particle size in the zinc silicate shop primer can be obtained. More specifically (in this embodiment), the zinc has a mean particle size in the range of 2–4 $\mu$m, micaceous iron oxide has a mean particle size in the range of 5–10 $\mu$m and the second filler has a mean particle size in the range of 8–15 $\mu$m.

As mentioned above additives may be added to the composition of the invention as long, as the percentages of zinc, the fillers, one or more silicates, and water are maintained within the stated ranges.

Examples of additives that could be added include thickening agents, accelerators, wetting and dispersing agents. The amount of additives can be up to 22% by volume, such as such as 0.03–12% by volume, preferably 0.03–5% by volume, of the (wet) composition.

Addition of one or more thickening agents in a ratio of 0.01–10% by volume, such as 0.01–5% by volume, preferably 0.05–2% by volume, of the (wet) composition improves the anti-settling properties, film formation and spraying properties of the shop primer. Examples of suitable thickening agents are bentonite, fumed/colloidal silica, natural thickeners (e.g. alginates), cellulosic thickeners, saccharides, and polysaccharides.

Addition of 0.01–10% by volume, such as 0.01–2% by volume, preferably 0.05–1% by volume, of the (wet) composition of a wetting and dispersing agent facilitates the production and improves the film formation. Examples of wetting and dispersing agents that could be added include ammonium salts of polyacrylic acid, cellulose, non-ionic surfactants, anionic surfactants, and cationic surfactants.

By adding an accelerator in 0.01–10% by volume, such as 0.02–5% by volume, preferably 0.2–2% by volume, of the (wet) composition to the composition the curing time of the composition can be reduced. Suitable accelerators are organo siliconates (e.g. of the type (R—Si(OX)(OY)(OZ)) defined in U.S. Pat. No. 3,549,395 (Sears and Smith) which is hereby incorporated by reference), alkaline borates, trimethyl borates, titanates, alcohols, colloidal silica, silanes, tin oxides, choline base, choline, chelates such as EDTA, iron oxide, red lead, sodium bisulphate, sodium bicarbonate, sodium dihydrogen phosphate, potassium chloride, potassium bromide, and sucrose, preferably organo siliconates such as sodium methyl siliconate, sodium ethyl siliconate, sodium propyl siliconate, potassium methyl siliconate, potassium ethyl siliconate, potassium propyl siliconate, etc.

It is believed that the present invention provides novel shop primers having a relatively low content of zinc and excellent properties with respect to corrosion resistance. Thus, the shop primer according to the present invention, when applied as a 15–25 $\mu$m dry film to steel surfaces exposed outdoor for 6 months in accordance with the Standard Practice for Conducting Exposure Tests of Paints on Steel (ASTM D 1014-95), preferably tests to a rust grade of 6–10, such as 7–10, in particular 8–10, when. evaluated according to the Standard Test Method for Evaluating Degree of Rusting on Painted Steel Surfaces (ASTM D 610-95). The rust grade can be determined for red rust and for white rust. Suppression of red rust is particularly important at this form or rust will have a detrimental effect on welding. White rust can, although in a time consuming step, before welding be removed by water rinsing. Thus, it is particularly important that the rust grade for red rust is high, such as 7–10, in particular 8–10, more preferably 9–10, especially 10, after exposure for 6 months. The rust grade for white rust should preferably be at least 5, such as at least 6, preferably at least 7, after exposure for 6 months.

It should be understood that various more specific embodiments with respect to the balance of zinc, micaceous iron oxide and any second filler are envisaged within the scope of the present invention.

In one particularly interesting embodiment, the present invention relates to a shop primer composition comprising a pigment mixture, one or more alkali metal silicates, optionally one or more additives, and water, wherein the pigment mixture comprises 75–90% by weight, such as 78–88% by weight, of zinc and 10–25% by weight, such as 12–22% by weight, of micaceous iron oxide. The best mode within this embodiment is illustrated with compositions 162 and 149.

In another particularly interesting embodiment, the present invention relates to a shop primer composition comprising a pigment mixture, one or more alkali metal silicates, optionally one or more additives, and water, wherein the pigment mixture comprises 70–90% by weight, such as 70–85% by weight, of zinc, 10–25% by weight, such as 10–20% by weight, of micaceous iron oxide and 3–20% by weight, such as 5–15% by weight, of a second filler. The best mode within this embodiment is illustrated with compositions 174 and 176.

In still another particularly interesting embodiment, the present invention relates to a shop primer composition comprising a pigment mixture, one or more alkali metal silicates, optionally one or more additives, and water, wherein the pigment mixture comprises 40–60% by weight, such as 40–55% by weight, of zinc, 10–25% by weight, such as 10–20% by weight, of micaceous iron oxide and 25–45% by weight, such as 30–45% by weight, of a second filler. The best mode within this embodiment is illustrated with composition 74 and 150.

As mentioned above, it is also contemplated that compositions having a very high content of micaceous iron oxide are possible within the scope of the present invention. Thus, in still another particularly interesting embodiment, the present invention relates to a shop primer composition comprising a pigment mixture, one or more alkali metal silicates, optionally one or more additives, and water, wherein the pigment mixture comprises 40–60% by weight of zinc, 25–60% by weight of micaceous iron oxide and 0–25% by weight of a second filler.

Because of the high reactivity of metallic zinc with water, the final mixing of the components of a shop primer containing non surface-treated metallic zinc has to be done immediately before the application of the shop primer onto the steel material.

A typical procedure for the manufacturing of a shop primer is as follows: to the extent that a thickening agent and/or a wetting agent are included in the shop primer composition they are initially mixed with parts of or the total amount of water and stirred until dissolved. Any fillers that need to be ground in order to obtain the correct particle size distribution are added and the mixture is ground until the size of agglomerates of filler(s) is below 50 µm, preferably below 20 µm. Subsequently, any remaining fillers are added and the mixture is dispersed for 5–15 minutes. Finally, parts of or any remaining water and the silicate(s) are added. If the shop primer composition includes an accelerator it is typically added as the last component. Immediately before application of the shop primer, zinc and any remaining water are added to the mixture.

This being said, the shop primer is advantageously provided as a kit for subsequent admixture, optionally with additional water in order to obtain the optimal sprayability. Thus, the present invention also relates to a kit for preparing a ready-to-use shop primer composition (optionally after addition of additional water), where the kit comprises a first separate portion comprising zinc and a second separate portion comprising pigment components other than zinc, one or more silicates, optionally one or more additives, and water, wherein combination of the first separate portion, the second separate portion and any additional water will give a shop primer composition as defined herein.

The embodiments described further above for the shop primer composition also applies for the kit, however, the ranges described for the total composition applies for the kit components in combination with additional water.

Alternatively, the shop primer can be prepared by mixing a zinc powder composition comprising one or more of the fillers, and/or one or more of the additives, with a composition containing the remaining components and the water. Kits having this constitution are also possible within the present invention.

After final mixing, the shop primer is typically applied onto a steel surface, preferably by spraying, to a final thickness of 10–30 µm, such as 15–25 µm. Such a coating will provide a temporary protection to the steel surface.

This being said, the present invention also relates to a method for temporarily protecting a steel surface with an anti-corrosive coating, the method comprising coating the steel surface with a shop primer composition as defined herein. The steel surface is preferably coated with a 10–30 µm layer of the shop primer composition. The anti-corrosive coating will preferably exhibit to a rust grade of 6–10 when tested after 6 months of exposure evaluated according to the Standard Test Method for Evaluating Degree of Rusting on Painted Steel Surfaces (ASTM D 610-95). In particular, the rust grades with respect to red and white rust will preferably be as above.

The thus coated steel surfaces will typically be stored for 2–40 weeks such as up to around 6 months, where after the steel surfaces can be used in the manufacture of steel constructions where the coated steel surfaces are surfaces of steel body parts of which the steel construction is constituted. The steel construction is assembled by welding and importantly, the steel body parts coated with the composition according to the invention can readily be welded to provide high quality junctions between the steel body parts of the steel constructions.

Thus, the present invention also relates to a method for manufacturing a steel construction, said steel construction being constituted by a plurality of steel body part, said method comprising the steps of;

a) coating at least one of the steel body parts with a shop primer composition according to claim 1;

b) storing the thus coated steel body part(s) for a period of 2–40 weeks, c) assembling at least a part of the steel construction by welding together at least two of the steel body parts, at least one of said at least two steel body parts being coated as in step (a).

Further steps and details in the manufacturing of a steel construction will be obvious for the person skilled in the art.

EXPERIMENTS

EXAMPLE 1 (MIO)

Composition 149:

Component A was prepared by mixing the following components in the approximate proportions: 28 parts by weight (36 parts by volume) of water was mixed with 0.17 parts by weight (0.2 parts by volume) of sodium alginate (Manutex RM ex. Kelco) until dissolved. 38 parts (11.1 parts of potassium silicate and 26.9 parts of water) by weight (40 parts by volume, corresponding to 5.9 parts of potassium silicate and 34.1 parts of water) of potassium silicate solution (Kali Wasserglass 28/30 ex. Henkel) and 17 parts (3.7 parts of lithium silicate and 13.3 parts of water) by weight (19 parts by volume corresponding to 2.2 parts of lithium silicate and 16.8 parts of water) of lithium silicate solution (Lithium Polysilicate 48 ex. Du Pont) was added and the mixture was stirred for 1 hour. Finally, 17 parts by weight (5 parts by volume) of micaceous iron oxide (Laminox ZR ex. Omya—particle size 5–10 μm, 95%<25 μm) was dispersed in the mixture. Prior to application, 52 parts by weight (86 parts by volume) of component A was mixed with 48 parts by weight (14 parts by volume) zinc powder (Zinc Dust Super Extra ex. Larvik Pigment SA—mean particle size 2–4 μm) so as to obtain composition 149.

EXAMPLE 2 (MIO+BaSO₄)

Composition 74:

Component A was prepared by mixing the following components in the approximate proportions: 6 parts by weight of water was mixed with 0.06 parts by weight of sodium alginate (Manutex RM ex. Kelco) until dissolved. 0.06 parts by weight of a solution of ammonium salt of polyacrylic acid (Pigmentverteiler A ex. BASF) and 36 parts by weight barium sulphate (Barytmehl F ex. Sachtleben—mean particle size 5–10 μm) was ground in the mixture. After grinding, the remaining 1 parts by weight of water, 32 parts by weight of potassium silicate solution (Kali Wasserglass 28/30 ex. Henkel) and 12 parts by weight of lithium silicate solution (Lithium Polysilicate 48 ex. Du Pont) was added and the mixture was stirred for 1 hour. Finally, 13 parts by weight of micaceous iron oxide (Laminox ZR ex. Omya—particle size 5–10 μm, 95%<25 μm) was dispersed in the mixture. Prior to application, 68 parts by weight of component A was mixed with 32 parts by weight zinc powder (Standard 7 ex. Larvik Pigment SA—particle size 6–9 μm) and 0.8 parts of a solution of potassium methyl siliconate (BS 15 ex. Wacker-Chemie). The mixture was thinned with 22 parts by weight of water before application so as to obtain composition 74.

EXAMPLE 3 (MIO+BaSO₄)

Composition 150:

Component A was prepared by mixing the following components in the approximate proportions: 6 parts by weight of water was mixed with 0.06 parts by weight of sodium alginate (Manutex RM ex. Kelco) until dissolved. 0.06 parts by weight of a solution of ammonium salt of polyacrylic acid (Pigmentverteiler A ex. BASF) and 36 parts by weight barium sulphate (Barytmehl F ex. Sachtleben—mean particle size 5–10 μm) was ground in the mixture. After grinding, the remaining 1 parts by weight of water, 32 parts by weight of potassium silicate solution (Kali Wasserglass 28/30 ex. Henkel) and 12 parts by weight of lithium silicate solution (Lithium Polysilicate 48 ex. Du Pont) was added and the mixture was stirred for 1 hour. Finally, 13 parts by weight of micaceous iron oxide (Laminox ZR ex. Omya—mean particle size 5–10 μm, 95%<25 μm) was dispersed in the mixture. Prior to application, 70 parts by weight of component A was mixed with 30 parts by weight zinc powder (Standard 7 ex. Larvik Pigment SA—mean particle size 6–9 μm). The mixture was thinned with 22 parts by weight of water before application so as to obtain composition 150.

EXAMPLE 4 (MIO)

Composition 162:

Component A was prepared by mixing the following components in the approximate proportions: 35 parts by weight of water was mixed with 0.06 parts by weight of sodium alginate (Manutex RM ex. Kelco) until dissolved. 0.06 parts by weight of a solution of ammonium salt of polyacrylic acid (Pigmentverteiler A ex. BASF) was added. 31 parts by weight of potassium silicate solution (Kali Wasserglass 28/30 ex. Henkel) and 11 parts by weight of lithium silicate solution (Lithium Polysilicate 48 ex. Du Pont) was added and the mixture was stirred for 1 hour. Finally, 23 parts by weight of micaceous iron oxide (Laminox ZR ex. Omya—particle size 5–10 μm, 95%<25 μm) was dispersed in the mixture. Prior to application, 53 parts by weight of component A was mixed with 47 parts by weight zinc powder (Zinc Dust Super Extra ex. Larvik Pigment SA—mean particle size 2–4 μm) so as to obtain composition 162.

EXAMPLE 5 (MIO+Muscovite)

Composition 174.

Component A was prepared by mixing the following components in the approximate proportions: 6 parts by weight of water was mixed with 0.06 parts by weight of sodium alginate (Manutex RM ex. Kelco) until dissolved. 0.06 parts by weight of a solution of ammonium salt of polyacrylic acid (Pigmentverteiler A ex. BASF) and 6 parts by weight muscovite (Microfine Wet Ground Mica, "P" grade ex. Microfine—mean particle size 6–8 μm) was ground in the mixture. After grinding, the remaining 31 parts by weight of water, 32 parts by weight of potassium silicate solution (Kali Wasserglass 28/30 ex. Henkel) and 12 parts by weight of lithium silicate solution (Lithium Polysilicate 48 ex. Du Pont) was added and the mixture was stirred for 1 hour. Finally, 13 parts by weight of micaceous iron oxide (Laminox ZR ex. Omya—particle size 5–10 μm, 95%<25 μm) was dispersed in the mixture. Prior to application, 52 parts by weight of component A was mixed with 48 parts by weight zinc powder (Zinc Dust Super Extra ex. Larvik Pigment SA—mean particle size 2–4 μm) and 0.6 parts of a solution of potassium methyl siliconate (BS 15 ex. Wacker-Chemie) so as to obtain composition 174.

EXAMPLE 6 (MIO+Quartz)

Composition 176:

Component A was prepared by mixing the following components in the approximate proportions: 6 parts by weight of water was mixed with 0.06 parts by weight of sodium alginate (Manutex RM ex. Kelco) until dissolved. 0.06 parts by weight of a solution of ammonium salt of polyacrylic acid (Pigmentverteiler A ex. BASF) and 6 parts by weight quartz (Sikron M-500 ex Sibelco S.C.R. Sibalco SA—mean particle size 2–3 μm) was ground in the mixture. After grinding, the remaining 31 parts by weight of water, 32 parts by weight of potassium silicate solution (Kali Wasserglass 28/30 ex. Henkel) and 12 parts by weight of lithium silicate solution (Lithium Polysilicate 48 ex. Du Pont) was added and the mixture was stirred for 1 hour. Finally, 13 parts by weight of micaceous iron oxide (Laminox ZR ex. Omya—particle size 5–10 μm, 95%<25 μm) was dispersed in the mixture. Prior to application, 52 parts by weight of component A was mixed with 48 parts by weight zinc powder (Zinc Dust Super Extra ex. Larvik Pigment SA—mean particle size 2–4 μm) and 0.6 parts of a solution of potassium methyl siliconate (BS 15 ex. Wacker- Chemie) so as to obtain composition 176.

REFERENCE EXAMPLE 1 (Kaolin)

Composition 108:

Component A was prepared by mixing the following components in the approximate proportions: 7 parts by weight of water was mixed with 0.07 parts by weight of sodium alginate (Manutex RM ex. Kelco) until dissolved. 0.07 parts by weight of a solution of ammonium salt of polyacrylic acid (Pigmentverteiler A ex. BASF) and 37 parts by weight kaolin (China Clay, Grade E ex. ECC International—mean particle size 5 μm, 80% 21 10 μm) was ground in the mixture. After grinding, the remaining 2 parts by weight of water, 39 parts by weight of potassium silicate solution (Kali Wasserglass 28/30 ex. Henkel) and 15 parts by weight of lithium silicate solution (Lithium Polysilicate 48 ex. Du Pont) was added and the mixture was stirred for 1 hour. Prior to application, 65 parts by weight of component A was mixed with 35 parts by weight zinc powder (Standard 7 ex. Larvik Pigment SA—mean particle size 6–9 μm). The mixture was thinned with 22 parts by weight of water before application so as to obtain composition 108.

REFERENCE EXAMPLE 2 ($BaSO_4$)

Composition 93:

Component A was prepared by mixing the following components in the approximate proportions: 6 parts by weight of water was mixed with 0.06 parts by weight of sodium alginate (Manutex RM ex. Kelco) until dissolved. 0.06 parts by weight of a solution of ammonium salt of polyacrylic acid (Pigmentverteiler A ex. BASF) and 49 parts by weight barium sulphate (Barytmehl F ex. Sachtleben—mean particle size 5–10 μm) was ground in the mixture. After grinding, the remaining 1 parts by weight of water, 32 parts by weight of potassium silicate solution (Kali Wasserglass 28/30 ex. Henkel) and 12 parts by weight of lithium silicate solution (Lithium Polysilicate 48 ex. Du Pont) was added and the mixture was stirred for 1 hour. Prior to application, 70 parts by weight of component A was mixed with 30 p arts by weight zinc powder (Standard 7 ex. Larvik Pigment SA—mean particle size 6–9 μm). The mixture was thinned with 22 parts by weight of water before application so as to obtain composition 93.

REFERENCE EXAMPLE 3 (Nepheline Syenite)

Composition 107:

Component A was prepared by mixing the following components in the approximate proportions: 7 parts by weight of water was mixed with 0.07 parts by weight of sodium alginate (Manutex RM ex. Kelco) until dissolved. 0.07 parts by weight of a solution of ammonium salt of polyacrylic acid (Pigmentverteiler A ex. BASF) and 37 parts by weight nepheline syenite (Minex S 20 ex. North Cape Nefelin A/S—mean particle size 5 μm) was ground in the mixture. After grinding, the remaining 2 parts by weight of water, 39 parts by weight of potassium silicate solution(Kali Wasserglass 28/30 ex. Henkel) and 15 parts by weight of lithium silicate solution (Lithium Polysilicate 48 ex. Du Pont) was added and the mixture was stirred for 1 hour. Prior to application, 65 parts by weight of. component A was mixed with 35 parts by weight zinc powder (Standard 7 ex. Larvik Pigment SA—mean particle size 6–9 μm). The mixture was thinned with 22 parts by weight of water before application so as to obtain composition 107.

REFERENCE EXAMPLE 4 (Quartz)

Composition 109:

Component A was prepared by mixing the following components in the approximate proportions: 7 parts by weight of water was mixed with 0.07 parts by weight of sodium alginate (Manutex RM ex. Kelco) until dissolved. 0.07 parts by weight of a solution of ammonium salt of polyacrylic acid (Pigmentverteiler A ex. BASF) and 37 parts by weight quartz (Sikron M-500 ex Sibelco S.C.R. Sibalco SA—mean particle size 2–3 μm) was ground in the mixture. After grinding, the remaining 2 parts by weight of water, 39 parts by weight of potassium silicate solution (Kali Wasserglass 28130 ex. Henkel) and 15 parts by weight of lithium silicate solution (Lithium Polysilicate 48 ex. Du Pont) was added and the mixture was stirred for 1 hour. Prior to application, 65 parts by weight of component A was mixed with 35 parts by weight zinc powder (Standard 7 ex. Larvik Pigment SA—mean particle size 6–9 μm). The mixture was thinned with 22 parts by weight of water before application so as to obtain composition 109.

REFERENCE EXAMPLE 5 ($Fe_2P+BaSO_4$)

Composition 96:

Component A was prepared by mixing the following components in the approximate proportions: 6 parts by weight of water was mixed with 0.06 parts by weight of sodium alginate (Manutex RM ex. Kelco) until dissolved. 0.06 parts by weight of a solution of ammonium salt of polyacrylic acid (Pigmentverteiler A ex. BASF) and 35 parts by weight barium sulphate (Barytmehl F ex. Sachtleben—mean particle size 5–10 μm) was ground in the mixture. After grinding, the remaining 1 part by weight of water, 30 parts by weight of potassium silicate solution (Kali Wasserglass 28/30 ex. Henkel) and 11 parts by weight of lithium silicate solution (Lithium Polysilicate 48 ex. Du Pont) was added and the mixture was stirred for 1 hour. Finally, 17 parts by weight of iron phosphide (Ferrophos HRS 2132—mean particle size 3 μm) was dispersed in the mixture. Prior to application, 71 parts by weight of component A was mixed with 29 parts by weight zinc powder (Standard 7 ex. Larvik Pigment SA—mean particle size 6–9 μm). The mixture was thinned with 22 parts by weight of water before application so as to obtain composition 96.

REFERENCE EXAMPLE 6 ($Fe_2P+BaSO_4$)

Composition 97:

Component A was prepared by mixing the following components in the approximate proportions: 6 parts by weight of water was mixed with 0.06 parts by weight of sodium alginate (Manutex RM ex. Kelco) until dissolved. 0.06 parts by weight of a solution of ammonium salt of polyacrylic acid (Pigmentverteiler A ex. BASF) and 35 parts by weight barium sulphate (Barytmehl F ex. Sachtleben—mean particle size 5–10 μm) was ground in the mixture. After grinding, the remaining 1 part by weight of water, 30 parts by weight of potassium silicate solution (Kali Wasserglass 28/30 ex. Henkel) and 11. parts by weight of lithium silicate solution (Lithium Poly-silicate 48 ex. Du Pont) was added and the mixture was stirred for 1 hour. Finally, 17 parts by weight of iron phosphide (Ferrophos HRS 2132—mean particle size 3 μm) was dispersed in the mixture. Prior to application, 71 parts by weight of component A was mixed with 29 parts by weight zinc powder (Zinc Dust Super Extra ex. Larvik Pigment SA—mean particle size 2–4 μm). The mixture was thinned with 22 parts by weight of water before application so as to obtain composition 97.

REFERENCE EXAMPLE 7 ($Fe_2P+BaSO_4$)

Composition 110:

Component A was prepared by mixing the following components in the approximate proportions: 6 parts by weight of water was mixed with 0.06 parts by weight of sodium alginate (Manutex RM ex. Kelco) until dissolved. 0.06 parts by weight of a solution of ammonium salt of polyacrylic acid (Pigmentverteiler A ex. BASF) and 25 parts by weight kaolin (China Clay, Grade E ex. ECC International—mean particle size 5 μm, 80%<10 μm) was ground in the mixture. After grinding, the remaining 2 parts by weight of water, 35 parts by weight of potassium silicate solution (Kali Wasserglass 28/30 ex. Henkel) and 12 parts by weight of lithium silicate solution (Lithium Polysilicate 48 ex. Du Pont) was added and the mixture was stirred for 1 hour. Finally, 20 parts by weight of iron phosphide (Ferrophos HRS 2132—mean particle size 3 μm) was dispersed in the mixture. Prior to application, 68 parts by weight of component A was mixed with 32 parts by weight zinc powder (Standard 7 ex. Larvik Pigment SA—mean particle size 6–9 μm). The mixture was thinned with 22 parts by weight of water before application so as to obtain composition 110.

REFERENCE EXAMPLE 8 ($Fe_2P$)

Composition 99:

Component A was prepared by mixing the following components in the approximate proportions: 34 parts by weight of water was mixed with 52 parts by weight of potassium silicate solution (Kali Wasserglass 28/30 ex. Henkel). 14 parts by weight of lithium silicate solution (Lithium Polysilicate 48 ex. Du Pont) was added and the mixture was stirred for 1 hour. Finally, 27 parts by weight of iron phosphide (Ferrophos HRS 2132—mean particle size 3 μm)) was dispersed in the mixture. Prior to application, 54 parts by weight of component A was mixed with 46 parts by weight zinc powder (Zinc Dust Super Extra ex. Larvik Pigment SA—mean particle size 2–4 mm) so as to obtain composition 99.

Pigment Mixture

The constitution of the pigment mixture for each of the compositions are given in Table 1 (compositions according to the invention) and Table 2 (reference examples).

TABLE 1

| | (% w/w) | | | | | |
|---|---|---|---|---|---|---|
| Composition | 149 | 74 | 150 | 162 | 174 | 176 |
| Zinc | 84.5 | 49.0 | 46.6 | 79.6 | 82.8 | 83.8 |
| MIO | 15.5 | 13.5 | 14.1 | 20.4 | 11.6 | 11.6 |
| $BaSO_4$ | | 39.5 | 39.3 | | | |
| Muscovite | | | | | 5.6 | |
| Quartz | | | | | | 5.6 |
| Pigment mixture (% v/v) of wet composition | 18.4 | 29.2 | 29.4 | 20 | 20 | 20 |
| Silicate (% v/v) of wet composition | 6.9 | 8.1 | 8.1 | 5.5 | 5.5 | 5.5 |

TABLE 2

| | (% w/w) | | | | | | | |
|---|---|---|---|---|---|---|---|---|
| Composition | 108 | 93 | 107 | 109 | 96 | 97 | 110 | 99 |
| Zinc | 59.3 | 47.4 | 59.7 | 58.9 | 44.3 | 44.3 | 51.7 | 80.0 |
| $Fe_2P$ | | | | | 18.3 | 18.3 | 21.3 | 20.0 |
| $BaSO_4$ | | 52.6 | | | 37.4 | 37.4 | 27.0 | |
| Quartz | | | | 41.1 | | | | |
| Kaolin | 40.7 | | | | | | | |
| nepheline syenite | | | 40.3 | | | | | |
| Pigment mixture (% v/v) of wet composition | 29.4 | 29.4 | 29.4 | 29.4 | 29.4 | 29.4 | 29.4 | 18.5 |
| Silicate (% v/v) of wet composition | 8.1 | 8.1 | 8.1 | 8.1 | 8.1 | 8.1 | 8.1 | 7.0 |

Tests

Anti-corrosive performance (Rusting)

The shop primer compositions (examples and reference examples) were applied by robot onto steel panels in an approximately 15–25 μm layer, in accordance with the Standard Practice for Conducting Exposure Tests of Paints on Steel (ASTM D 1014-95). After two weeks of curing time in a climate room in the laboratory, the panels were exposed to natural weathering for 24 weeks in Lundtofte (Denmark) (industrial atmosphere) and Kyndby (Denmark) (marine atmosphere), respectively.

The results from the weathering exposure of the shop primer treated steel panels were evaluated in accordance with the Standard Test Method for Evaluating Degree of Rusting on Painted Steel Surfaces (ASTM D 610-95 and ASTM D1014/ISO 2810-1974), and the results are shown in Tables 3 and 4; 0 is poor performance and 10 is the best performance according to the ASTM evaluation.

TABLE 3

| | | | NW Lundtofte 24 weeks | |
|---|---|---|---|---|
| Ex. | Comp. | DFT* μm | red rust | white rust |
| 1 | 149 | 20 | 10 | 8 |
| 2 | 74 | 29 | 10 | 5 |
| 3 | 150 | 19 | 10 | 6 |
| Ref. 1 | 108 | 20 | 5 | 4 |
| Ref. 2 | 93 | 20 | 6 | 6 |
| Ref. 3 | 107 | 25 | 5 | 4 |
| Ref. 4 | 109 | 25 | <3 | — |
| Ref. 5 | 96 | 26 | 3 | — |
| Ref. 6 | 97 | 20 | 3 | — |
| Ref. 7 | 110 | 20 | 10 | 8 |
| Ref. 8 | 99 | 25 | 10 | 5 |

*DFT: dry film thickness

TABLE 4

| | | | NW Lundtofte | | | | NW Kyndby | |
|---|---|---|---|---|---|---|---|---|
| | | | 3 months | | 10 months | | 4 months | |
| Ex. | Comp. | DFT μm | red rust | white rust | red rust | white rust | red rust | white rust |
| 4 | 162 | 20 | 10 | 8 | 10 | 8 | 10 | 7 |
| 5 | 174 | 19 | 10 | 8 | 10 | 8 | 10 | 7 |
| 6 | 176 | 23 | 10 | 7 | 10 | 8 | 10 | 7 |

As is apparent from the results in Tables 3 and 4, compositions having an amount of micaceous iron oxide of in the pigment mixture of in the range of 10–60% by weight, in particular 10–25%, show remarkable anti-corrosive properties. The shop primer compositions according to the invention are superior to compositions comprising "other fillers" only (Reference examples 1–4) and are excellent alternatives, and even improvements, to iron phosphide-containing shop primers (Reference examples 5–8).

What is claimed is:

1. A water-borne shop primer composition comprising
    (a) 5–40% by volume of a pigment mixture,
    (b) 1.4–10% by volume of one or more water soluble silicates (based on the dry volume of the silicate), and
    (c) 40–90% by volume of water,
    said pigment mixture comprising
        40–90% by weight of zinc,
        10–60% by weight of micaceous iron oxide, and 0–50% by weight of a second filler selected from the group consisting of iron oxides, natural barium sulphate, precipitated barium sulphate, barytes, blanc fixe, aluminium silicate, kaolin, kaolinite, china clay, magnesium silicate, magnesium hydrosilicate, mica, talc, chlorite, tremolite, silica, surface treated silica, amorphous quartz, crystalline quartz, fumed silica, aluminium oxide, aluminium oxide hydrate, bauxite, calcined bauxite, calcium magnesium carbonate, dolomite, natural calcium carbonate, precipitated calcium carbonate, aluminium silicates, feldspar, nepheline syenite, calcium silicates, wollastonite, zinc oxide, zinc phosphate, graphite, bismuth vanadate, lead chromate, silicium carbide, zeolites, pyrophyllite, glass flakes, iron phosphide, nickel phosphide, hollow spheres, and aluminium.

2. A shop primer composition according to claim 1, wherein the pigment mixture comprises zinc, micaceous iron oxide and a second filler.

3. A shop primer composition according to claim 1, wherein the amount of micaceous iron oxide is 10–25% by weight of the pigment mixture.

4. A shop primer composition according to claim 1, wherein the combined amount of micaceous iron oxide and any second filler is 15–60% by weight of the pigment mixture.

5. A shop primer composition according to claim 2, wherein the second filler includes barium sulphate.

6. A shop primer composition according to claim 2, wherein the second filler includes kaolin.

7. A shop primer composition according to claim 1, which when applied as a 15–25 μm dry film to steel surfaces exposed outdoor for 6 months in accordance with the Standard Practice for Conducting Exposure Tests of Paints on Steel (ASTM D 1014-95), exhibits to a rust grade of 6–10 evaluated according to the Standard Test Method for Evaluating Degree of Rusting on Painted Steel Surfaces (ASTM D 610-95).

8. A shop primer composition according to claim 2, wherein the zinc has a mean particle size in the range of 2–4 μm, the micaceous iron oxide has a mean particle size in the range of 5–10 μm and the second filler has a mean particle size in the range of 8–15 μm.

9. A shop primer composition according to claim 1, wherein the pigment mixture comprises 75–90% by weight of zinc and 10–25% by weight of micaceous iron oxide.

10. A shop primer composition according to claim 1, wherein the pigment mixture comprises 70–85% by weight of zinc, 10–25% by weight of micaceous iron oxide and 5–15% by weight of a second filler.

11. A shop primer composition according to claim 1, wherein the pigment mixture comprises 40–60% by weight of zinc, 10–25% by weight of micaceous iron oxide and 25–45% by weight of a second filler.

12. A shop primer composition according to claim 1, wherein the pigment mixture comprises 40–60% by weight of zinc, 25–60% by weight of micaceous iron oxide and 0–25% by weight of a second filler.

13. A kit for preparing a ready-to-use shop primer composition, where the kit comprises a first separate portion comprising zinc and a second separate portion comprising pigment components other than zinc, one or more silicates, optionally one or more additives, and water, wherein combination of the first separate portion, the second separate portion and, if required, additional water will give a shop primer composition according to claim 1.

14. A method for temporarily protecting a steel surface with an anti-corrosive coating, the method comprising coating the steel surface with a shop primer composition according to claim 1.

15. A method according to claim 14, wherein the steel surface is coated with a 10–30 μm layer of the shop primer composition.

16. A method according to claim 15, wherein the anti-corrosive coating after exposure for 6 months exhibits to a rust grade of 6–10 when evaluated according to the Standard Test Method for Evaluating Degree of Rusting on Painted Steel Surfaces (ASTM D 610-95).

17. A method for manufacturing a steel construction, said steel construction being constituted by a plurality of steel body parts, said method comprising the steps of:
   a) coating at least one of the steel body parts with a shop primer composition according to claim 1;
   b) storing the thus coated steel body parts for a period of 2–40 weeks,
   c) assembling at least a part of the steel construction by welding together at least two of the steel body parts, at least one of said at least two steel body parts being coated as in step (a).

18. A method according to claim 17, wherein the steel body parts are coated with a 10–30 μm layer of the composition.

19. A method according to claim 18, wherein the coating after exposure for 6 months exhibits to a rust grade of 6–10 when evaluated according to the Standard Test Method for Evaluating Degree of Rusting on Painted Steel Surfaces (ASTM D 610-95).

* * * * *